Dec. 11, 1956 R. L. HENRY, JR 2,774,014

MODULAR ELECTRONIC ASSEMBLY

Filed Oct. 31, 1952 3 Sheets-Sheet 1

INVENTOR.

Robert L. Henry, Jr.

BY

Walter S. Paul.

Attorneys

MODULAR ELECTRONIC ASSEMBLY

Filed Oct. 31, 1952 3 Sheets-Sheet 2

INVENTOR.
Robert L. Henry, Jr.
BY
Walter S. Paul.
attorneys

MODULAR ELECTRONIC ASSEMBLY

INVENTOR.
Robert L. Henry, Jr.
BY
Walter S. Paul
attorneys

United States Patent Office
2,774,014
Patented Dec. 11, 1956

2,774,014

MODULAR ELECTRONIC ASSEMBLY

Robert L. Henry, Jr., Silver Spring, Md., assignor to the United States of America as represented by the Secretary of the Navy Application October 31, 1952, Serial No. 318,148
14 Claims. (Cl. 317—101)
(Granted under Title 35, U. S. Code (1952), sec. 266)

The invention described herein may be manufactured and used by or for the Government of the United States of America for governmental purposes without the payment of any royalties thereon or therefor.

This invention relates generally to electronic and electrical apparatus and particularly to circuit components thereof which are standardized to a maximum to permit mass production of the apparatus.

The mass production of electronic and electrical equipment today is limited to the hand assembly of mechanically produced components such as capacitors, resistors and some inductors. For a typical example, the chassis of an assembly may be mounted on a belt type conveyor, while one person at the head of the assembly line will use a plurality of drills to provide the proper apertures in the chassis. The next person places tube sockets in the apertures and uses power driven tools for securing the tube sockets to the chassis. As the chassis proceeds along the assembly line succeeding persons hand place the various components on the chassis and solder them in place. Various sub-assemblies which are purchased complete from a subcontractor or are produced on other assembly lines may be placed on the chassis somewhere along the assembly line. Inspections are made at intervals in the line to determine the extent of proper assembly, and at the end of the line the completed assembly is tested and approved or rejected.

One of the reasons the assemblying must be performed by hand operation is due to the lack of standardized components, particularly those which are adapted to be handled by mechanical means. The ideal system would be to place raw materials for each element of the entire assembly into hoppers, performing operations on the raw materials to produce standard components capable of mechanical assembly, and mechanically assemblying the standard components into mechanically produced circuits, thereby providing a complete finished electronic assembly.

The instant invention teaches such an ideal system and the present invention relates to novel articles produced in this way.

It is an object of the present invention to provide an electronic assembly that is composed of a plurality of modular units which are capable of mechanical production and assembly.

Another object of the invention is to provide a standardized modular wafer, constructed preferably from ceramic material, which may be arranged in a modular manner with other wafers to form an electronic assembly or sub-assembly.

A further object of the invention is to provide the wafers as aforementioned with a plurality of notches on the periphery thereof which facilitate connection of a plurality of wafers into a single assembly or sub-assembly by a plurality of connecting wire risers.

A still further object of this invention is to utilize a plurality of wafers as aforementioned to form an electronic assembly wherein portions of the electric circuit of said assembly are printed on said wafers with the circuits on each wafer being interconnected by the risers fastened in the notches of each wafer.

Another object of the present invention is to furnish a wafer capable of mechanized mass production and operable in electronic assemblies and sub-assemblies, which is sufficiently flexible to permit the mass production of a great variety of such assemblies and is satisfactory from an electronics point of view.

Other objects and features will become apparent in following the description of the illustrated forms of the invention.

Figures 1, 2:
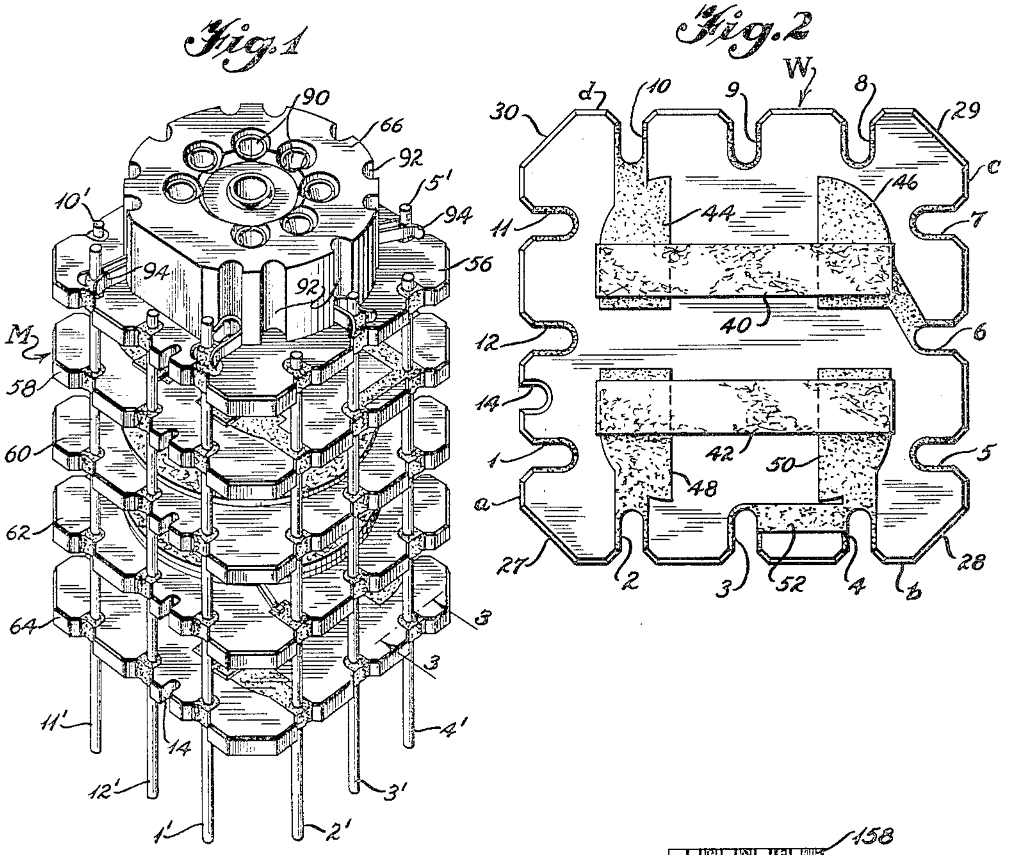
Fig. 1 is a perspective view of a module made of stacked wafers and constituting a sub-assembly adapted to be used in electronic gear and containing an electronic circuit.
Fig. 2 is a plan view of a typical wafer having resistors thereon and used in a module, e. g. the module of Fig. 1.

This modular system utilizes as its basis, a wafer standardized as to size and shape, several of which are shown in Figs. 1 and 2. Each wafer is a flat, thin, polygonal body, provided with a plurality of notches in the periphery thereof. As illustrated in Fig. 2 the wafer W has edges or sides *a*, *b*, *c* and *d*. Side *a* has a small orienting notch 14 therein, and this notch is utilized to maintain a predetermined position of the wafer in the machinery which handles the wafer, and as the starting point to identify the other notches. In order that all the notches may be identified, the single notch between orienting notch 14 and the corner of sides *a* and *b* has been given the numeral 1. Going in the same direction around the periphery of the wafer from the orienting notch, succeeding notches are numbered 2, 3 and 4 in side *b*; 5 and 6 and 7 in side *c*; 8, 9 and 10 in side *d*; and 11 and 12 in side *a*. Thus whether the top or bottom of the wafer is being viewed, it is a simple matter to locate the notches. The corner edges 27, 28, 29 and 30 are arranged at an angle of 45° with respect to the sides of the wafer. By beveling the corners the handling of each wafer by mechanical means is facilitated. Also, the corners are the most vulnerable portions of the wafer from a breakage standpoint. For example, if an imaginary intersection were made between extensions of edges *a* and *b*, the distance from this point to a line drawn between the most adjacent portions of notches 1 and 2 is greater than the distance from edge 27 to said line drawn between the most adjacent portions of notches 1 and 2. Thus, the mechanical advantage is reduced and less breakage results.

In many instances of modules a wafer, such as wafer W, serves as an insulator for an electronic circuit, and therefore, the wafer must have satisfactory electrical insulating qualities. Although many materials may be used satisfactorily in the production of wafers, steatite has been selected. It is a ceramic that is quite easily worked and fired. In view of space limitations involved in most military equipment, each wafer is made less than a square inch in planform area and only a sixteenth of an inch thick.

Wafer W, after being formed from raw steatite, has its notches (except orienting notch 14) coated with an electrical conductive material. It has been found that the use of a paint containing a ceramic flux such as glass, and silver is ideal because after such paint is applied, the wafer can be fired causing great adherence of the silver, the glass joining the silver to the steatite. After tinning the metalized portions of the wafer, one or more electronic components, as resistors 40 and 42, are applied to one or both surfaces of the wafer. To do this contacts 44, 46, 48, 50 and jumper 52 for the wafer W, are first applied to the wafer. They are made of the same material as the notch coatings and fixed in place by mechanical application and firing. The resistors are made with an adhesive surface that clings to the jumpers and/or contacts and the steatite between them. The jumpers and contacts are used for circuitry purposes, resistor 40 having contact 44 at one end thereof that connects with the coating in notch 10; and having contact 46 at the opposite end thereof that connects with the coating of notch 6. Resistor 42 has its contacts 48 and 50 in intimate contact with the coatings of notches 2 and 4, and the jumper 52, fired on the steatite wafer W, connects the coating of notch 4 with the coating of notch 3. If electronic components are to be applied to the opposite side of wafer W, this can now be done in a manner similar to the application of resistors 40 and 42.

Figure 4:
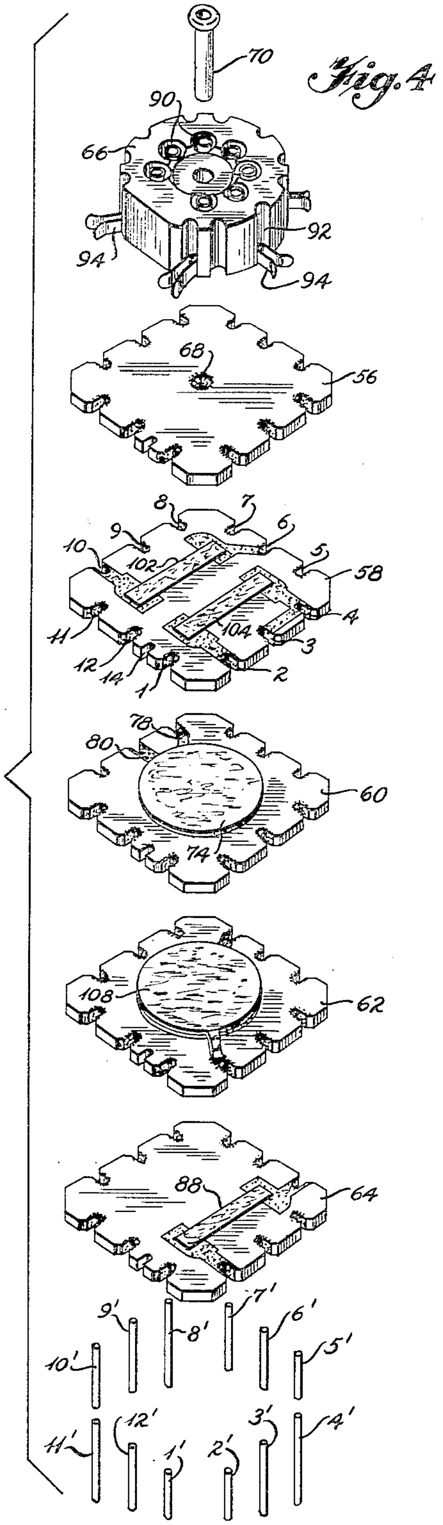
Fig. 4 is an exploded perspective view of the module of Fig. 1.
Figure 5:
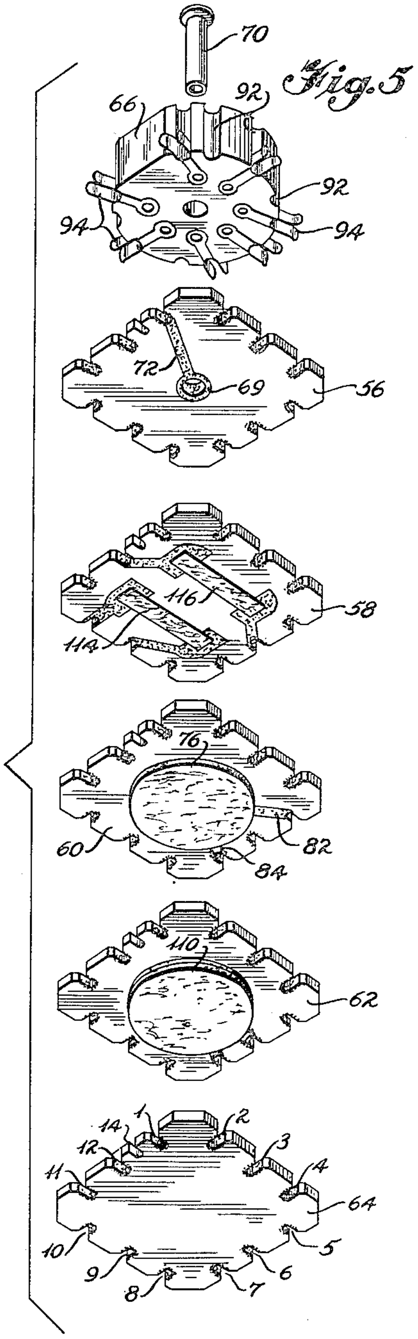
Fig. 5 is another exploded perspective view of the module of Fig. 1, illustrating primarily the opposite surfaces of the wafers in Fig. 4.

Attention is now invited to Figs. 4 and 5 where a number of wafers 56, 58, 60, 62 and 64 are shown. Each one is provided with at least one electronic component connected to the coating of one or more notches, and each wafer with its component or components are adapted to be assembled in a module, for example, the module M of Fig. 1. Wafer 56 is used as a support for tube socket 66, and is provided with a central aperture 68, the periphery of which has a coating 69 of electrically conductive material identical to that used to cover the notch surfaces of wafer W. The purpose of aperture 68 is to seat the electrostatic shield 70 which is located in an opening at the center of tube socket 66, and there is a contact 72 connecting coating 69 and one of the laterally opening notches of the wafer. Wafer 58 has two resistors on its top surface and two resistors on its bottom surface, together with suitably located contacts to connect them for electrical conduction with coatings of certain of the notches. Wafer 60 has a capacitor 74 on one surface and a capacitor 76 on the other surface. The capacitors are of disc formation bonded to the steatite wafer 60, and contacts 78, 80, 82 and 84 connect the capacitor leads to predetermined notches of the wafer. Wafer 62 shows the use of multiple discs to obtain a higher value capacitance, when desired; while wafer 64 illustrates the use of only one surface of the wafer to support a resistor 88.

The base of tube socket 66 may be made of steatite, or another ceramic, or any other suitable material. It has passages containing metal grommets 90 into which the tube prongs are to be separably connected, and the central bore necessary for accommodation of shield 70. A series of laterally opening grooves 92 are formed in the socket base, some (for module M) of which contain the root ends of the furcations of clips 94. The shank of each clip 94 is secured to the lower end of one of the metal grommets whereby electrical conductivity may be established from and to the prongs of a tube in the socket 66.

Figure 3:
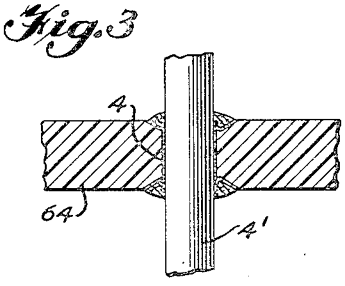
Fig. 3 is an enlarged sectional view taken on the line 3—3 of Fig. 1 and showing the connection of a riser to one wafer.
Figure 10:
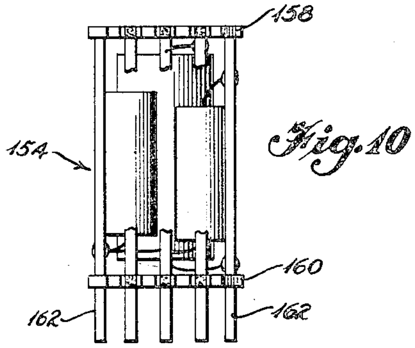
Fig. 10 is a module having conventional capacitors constituting a part thereof, showing the flexibility of the modular arrangement.

After manufacture of the component parts of a module, described previously, they are assembled in a stacked array and held in place by wire risers 1', 2', 3', 4', 5', 6', 7', 8', 9', 10', 11' and 12'. The selected wafers are placed so that the orienting notch 14 of each is superposed thereby assuring proper circuit arrangement. This holds true for the socket 66 because it is fixed to wafer 56 containing an orienting notch 14. The riser 1' is placed in all of the vertically aligned notches 1 of the wafers, and riser 2' is placed in all of the vertically aligned notches 2 of the wafers. The placement of risers in vertically aligned notches is repeated until all of the notches contain a riser, and then they are soldered (see Fig. 3) in place. Thus, the module, after testing, is complete and ready for use as a complete electronic device or as a sub-assembly with other modules or other circuits, depending on what is contained on the various wafers and how they are connected.

Figures 6, 7, 8, 9:
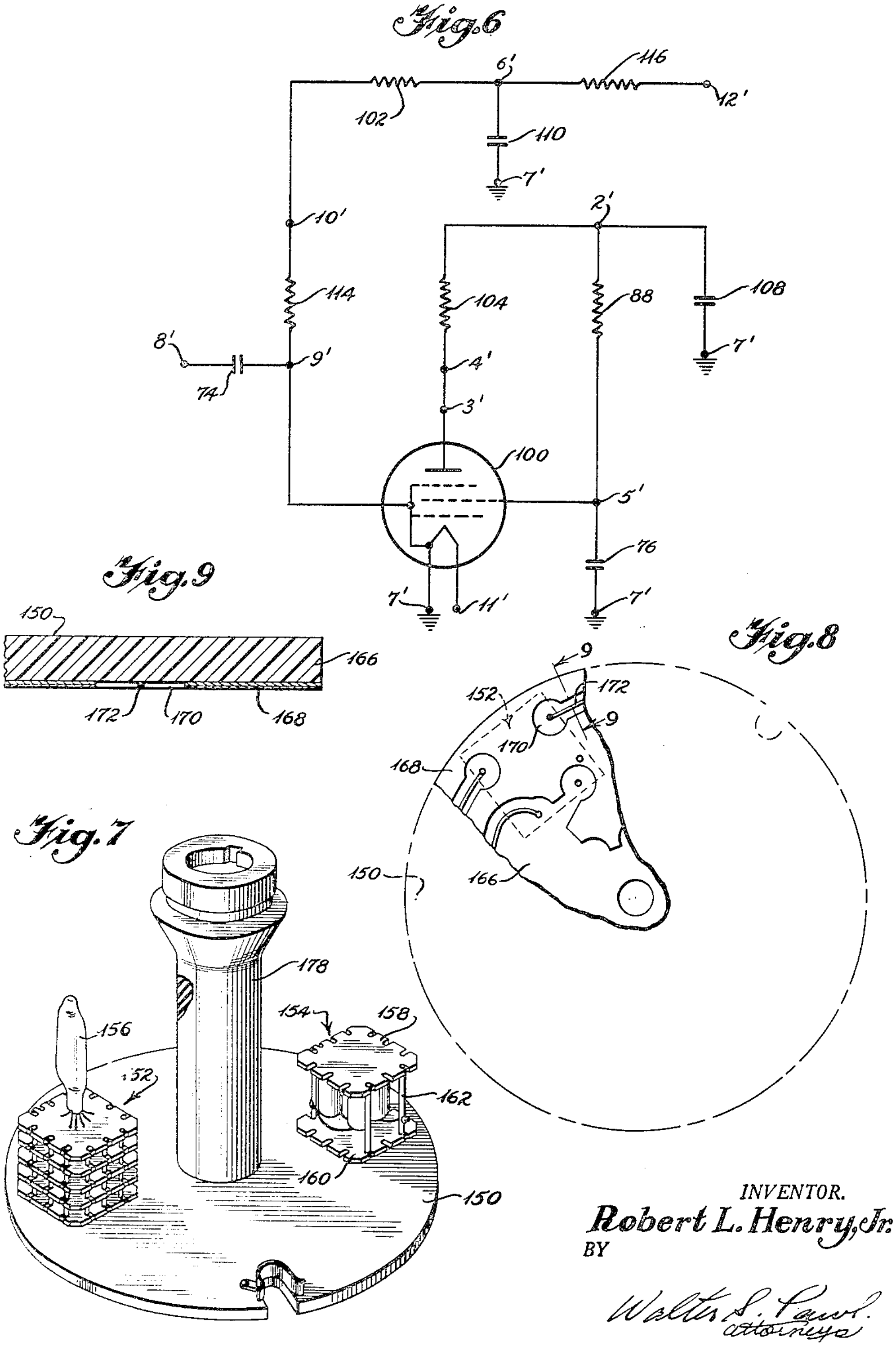
Fig. 6 is a wiring diagram of one of the simpler circuits possessed by a module, corresponding to the electronic components disposed on the wafers of Figs. 1, 4 and 5.
Fig. 7 is a perspective view of a modular assembly on a base plate.
Fig. 8 is a bottom view of the modular assembly of Fig. 7.
Fig. 9 is a sectional view taken on the line 9—9 of Fig. 8 and in the direction of the arrows.

In Fig. 6 there is a R.-C. circuit which, subject to proper selection of the values of the resistors and capacitors, may be used as an audio amplifier. For simplicity, the circuit is a schematic of module M (Figs. 1, 4 and 5). A pentode 100 that would be mounted in socket 66, is shown with one of its prongs connected to ground, such being effected by riser 7' fitting in all of the notches 7 of the module M. Another prong fits in a grommet 90 that contacts a clip 94 which is soldered to riser 11', the latter being soldered in all notches 11 of the module. Other prongs are connected with risers 3', 5' and 9' in a similar way. Following the order of appearance in Fig. 4 and then Fig. 5, resistors 102 and 104 on wafer 58 are connected respectively to risers 6' and 10'; and 2' and 3' (through 4'). Capacitor 74 is connected to risers 8' and 9' while capacitor 108 on wafer 62 is connected to risers 2' and the ground riser 7'. Resistor 88 is connected to risers 2' and 5', and capacitor 110 on wafer 62 (Fig. 5) is connected to risers 6' and 7'. Capacitor 76 on wafer 60 is connected with risers 5' and 7', while resistor 114 on wafer 58 is connected to risers 9' and 10'. Resistor 116, also on wafer 58, is connected to risers 6' and 12', and electrostatic shield 70 is connected to riser 1', developing the diagram of Fig. 6 from the components of Figs. 4 and 5, as seen assembled in Fig. 1 (tube 100 being omitted).

The basic modular form is disclosed in Fig. 1 although it need not be an audio amplifier, but may be any circuit or circuit portion. The modular unit may be used in many capacities, however, the present intention is to use it as a part of a more complex system whereby maintenance of electronic equipment will be simplified to such an extent that unskilled personnel may service the equipment with great speed and without error. This is particularly valuable in military fields. Instead of stocking resistors, capacitors etc., of various values, one module containing any number of these elements in a miniature sub-assembly will be kept in stock as a replacement part. Secondly and of equal or superior importance is the speed at which a complete electronic device can be made, this subject being dealt with in detail in copending application Serial No. 324,160 filed on December 4, 1952.

Figs. 7–10 are devoted to showing a typical use of the module. A base plate 150 of special construction serves to support module 152 and module 154. The former is similar to module M, except that a subminiature tube 156 is used, it being fixed directly to the top wafer, and module 154 (Fig. 10) consists of only two wafers 158 and 160 held spaced by risers 162, and between which the capacitors, resistors or other components are in standard form but have their leads connected to the risers 162. The lower ends of risers 162, the risers of module 152 and the risers of module M are passed through apertures in the base plate 150 and make contact with circuit portions printed thereon. The circuit printing technique is used because of the advantages in production that it displays.

As seen in Fig. 9 the base plate 150 comprises a sheet 166 of an insulating material, e. g. a phenolic condensate, on which there is a sheet 168 of conductive material, as copper. A passage 170 is formed in the sheet 168 by copper removal, isolating a strip 172 of copper which acts as a conductive wire against which one of the risers bears after passing into an aperture in sheet 166 to accommodate the riser. In this way any pattern of connection between two or more modules on the base plate may be effected. Moreover, more than one base plate for a single assembly of modules may be used, and one or more of the base plates may be used above the modules rather than below them as implied in Fig. 7.

To connect the modular assemblies together, a connector 178 may be used for holding the assemblies in a vertically stacked fashion. The connector is tubular and made of insulating material having the proper number of inner conductors to contact the conductors of the male plug connector of another modular assembly (unshown). Of course, it is not essential that the modular units be stacked vertically, they may be in juxtaposition or in no particularly set arrangement.

It is apparent that various modifications may be made without departing from the scope of the following claims.

What is claimed is:

1. A modular electrical circuit assembly comprising a plurality of wafers, each of said wafers being of substantially the same size and outer configuration and having a plurality of peripherally located notches therein, said wafers being disposed in separate parallel planes and being in alignment, the corresponding notches in each wafer also being in alignment, a plurality of conductors, each conductor located in aligned notches in said wafers and secured to said wafers, said conductors retaining said wafers spaced from each other to thereby provide air spaces between each wafer, at least some of said wafers having a circuit component thereon and connected to said conductors, and said conductors together with the circuits on said wafers forming the electrical circuit of said assembly.

2. The assembly of claim 1 and; said wafers being of electrically insulating material and said conductors being rigid wire and functioning to hold said wafers spaced from each other.

3. The assembly of claim 1 and; the top wafer of said plurality of wafers having a tube socket thereon, and means immovably fixing said socket to at least some of said conductors for electrical conduction.

4. The assembly of claim 1 and; said conductors extending beyond one end wafer of said plurality of wafers to constitute means of fastening the modular assembly to a base.

5. The assembly of claim 1 and; said circuit components being disposed on both surfaces of some of said wafers.

6. In a modular electronic assembly having a plurality of circuit patterns that include electronic components, a wafer to accommodate said patterns and said components, said wafer consisting of a flat ceramic member having an upper and a lower surface on which said components are adapted to be fixed, notches in the periphery of said member to accommodate electrical conductors, and the walls of said notches having a coating of electrically conductive material intimately joined thereto and adapted to be joined to the conductors.

7. In a modular electronic assembly having a plurality of circuit patterns that include electronic components, a wafer to accommodate said patterns and said components, said wafer consisting of a flat ceramic member having an upper and a lower surface on which said components are adapted to be fixed, notches in the periphery of said member to accommodate electrical conductors, and the walls of said notches having a coating of electrically conductive material intimately joined thereto and adapted to be joined to the conductors, said coating including a quantity of glass which will unite with the ceramic walls when subjected to sufficient heat.

8. In a modular electronic assembly, a base, a circuit pattern structure carried by said base, a plurality of modular units separably carried by said base, each unit having a circuit of its own and coordinating with said circuit pattern structure so as to interconnect all of said units, at least one of said units comprising a plurality of insulating wafers, means for retaining the wafers in stacked array but spaced from each other and for releasably connecting said one unit to said base, the circuit of said one of said units including electronic components mounted on one surface of some of said wafers, said wafers having laterally opening notches in which said retaining means are disposed, and conductor means united with the surface of said some of said wafers connecting said retaining means in said notches with said electronic components.

9. The combination of claim 8 and; a tube socket secured to one of said wafers, said retaining means being disposed in the notches of the last-mentioned wafer, and means connecting said retaining means to said tube socket.

10. In a module for a modular electrical apparatus, a ceramic wafer having substantially planar upper and lower surfaces that are parallel, each surface offering a seat for electronic components, said wafer having sides in which laterally opening notches are present, and the walls defining said notches having relieved upper and lower edges to accommodate a portion of a conductive coating.

11. In a module for a modular electrical apparatus, a ceramic wafer having substantially planar upper and lower surfaces that are parallel, each surface offering a seat for electronic components, said wafer having sides in which laterally opening notches are present, and the walls defining said notches having relieved upper and lower edges to accommodate a portion of a conductive coating, and the notches of each side being equally spaced and of similar depth and width.

12. The ceramic wafer of claim 10 and; one of said wafer sides having an orienting notch therein between two of the first-mentioned notches, and the orienting notch being of a different size from the other notches.

13. In a module for a modular electrical apparatus, a ceramic wafer having substantially planar upper and lower surfaces that are parallel, each surface offering a seat for electronic components, said wafer having sides in which laterally opening notches are present, and the walls defining said notches having relieved upper and lower edges to accommodate a portion of a conductive coating, each notch constituting a pocket to accommodate a riser that couples a number of wafers together in juxtaposition.

14. A modular unit for electronic devices, said unit comprising an upper wafer and a lower wafer spaced therefrom, a plurality of intermediate wafers disposed between said upper and lower wafers, and all of the wafers being in parallel but spaced planes, a plurality of risers mechanically connecting the wafers and holding them in said spaced planes with an air space therebetween, an electrical circuit having components carried by said wafers, said risers being in and a part of said circuit, each wafer having a plurality of outwardly opening notches in which said risers are fixed, and means forming parts of said circuit intimately united to said wafers in the region of said notches to connect for electrical conduction the risers and any circuit components carried by said wafers.

(References on following page)

References Cited in the file of this patent

UNITED STATES PATENTS

| | | |
|---|---|---|
| 2,066,876 | Carpenter | Jan. 5, 1937 |
| 2,439,412 | Mitchell | Apr. 13, 1948 |
| 2,474,988 | Sargrove | July 5, 1949 |
| 2,492,236 | Mydlil | Dec. 27, 1949 |
| 2,493,199 | Khouri | Jan. 3, 1950 |
| 2,509,909 | Davis | May 30, 1950 |
| 2,616,994 | Luhn | Nov. 4, 1952 |
| 2,651,833 | Kernahan | Sept. 15, 1953 |

FOREIGN PATENTS

| | | |
|---|---|---|
| 223,402 | Great Britain | Oct. 23, 1924 |
| 650,912 | Great Britain | Mar. 7, 1951 |
| 651,780 | Great Britain | Apr. 11, 1951 |